(12) United States Patent
Yoshida

(10) Patent No.: US 10,841,075 B2
(45) Date of Patent: Nov. 17, 2020

(54) TRANSMISSION CIRCUIT

(71) Applicant: FUJITSU LIMITED, Kawasaki (JP)

(72) Inventor: Hiroshi Yoshida, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/842,840

(22) Filed: Apr. 8, 2020

(65) Prior Publication Data

US 2020/0336287 A1    Oct. 22, 2020

(30) Foreign Application Priority Data

Apr. 22, 2019    (JP) .................................. 2019-080781

(51) Int. Cl.
*H04L 27/00*    (2006.01)
*H04L 7/033*    (2006.01)
*H04B 1/04*    (2006.01)

(52) U.S. Cl.
CPC ............. *H04L 7/0331* (2013.01); *H04B 1/04* (2013.01)

(58) Field of Classification Search
CPC ................................ H04L 7/0331; H04B 1/04
USPC .................................................. 375/295, 316
See application file for complete search history.

(56) References Cited

U.S. PATENT DOCUMENTS 7,613,268 B2 * 11/2009 Aweya .................... H03L 7/08
                                                                375/376
2009/0262876 A1   10/2009 Arima et al.
2014/0254734 A1 *  9/2014 Abdelmoneum ..... H03L 7/0995
                                                                375/376

FOREIGN PATENT DOCUMENTS

JP    2003-018229 A    1/2003
WO    2007/060756 A1   5/2007

* cited by examiner

*Primary Examiner* — Zewdu A Kassa
(74) *Attorney, Agent, or Firm* — Fujitsu Patent Center

(57) ABSTRACT

A transmission circuit includes a filter circuit configured to compensate for degradation of a multiplexed signal, based on a tap coefficient to be updated based on a first signal and a second signal which are time-division-multiplexed to the multiplexed signal, a phase locked loop (PLL) circuit configured to control, based on control information corresponding to phases of the first signal and the second signal, a frequency of a clock signal to be synchronized with the multiplexed signal whose degradation has been compensated, and a control circuit configured to generate, in response to an interruption of an input of the first signal or the second signal, the control information corresponding to the phase of the first signal or the second signal of which the interruption is not detected so as to output the control information to the PLL circuit.

9 Claims, 14 Drawing Sheets

TRANSMISSION CIRCUIT

CROSS-REFERENCE TO RELATED APPLICATION

This application is based upon and claims the benefit of priority of the prior Japanese Patent Application No. 2019-80781, filed on Apr. 22, 2019, the entire contents of which are incorporated herein by reference.

FIELD

The embodiment discussed herein is related to a transmission circuit.

BACKGROUND

As a unit for reproducing a clock signal from a data signal, there is a phase locked loop (PLL) circuit that controls a control voltage of a voltage-controlled oscillator (VCO) based on a phase difference between a clock signal extracted from a data signal and a clock signal generated by the VCO (refer to, for example, International Publication Pamphlet No. WO 2007/060756 and Japanese Laid-open Patent Publication No. 2003-18229).

SUMMARY

According to an aspect of the embodiments, a transmission circuit includes a filter circuit configured to compensate for degradation of a multiplexed signal, based on a tap coefficient to be updated based on a first signal and a second signal which are time-division-multiplexed to the multiplexed signal, a phase locked loop (PLL) circuit configured to control, based on control information corresponding to phases of the first signal and the second signal, a frequency of a clock signal to be synchronized with the multiplexed signal whose degradation has been compensated, and a control circuit configured to generate, in response to an interruption of an input of the first signal or the second signal, the control information corresponding to the phase of the first signal or the second signal of which the interruption is not detected so as to output the control information to the PLL circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When data signals input from two lines are subjected to time division multiplexing and to be input to a PLL circuit, and the input of one of the data signals is interrupted, synchronization between the data signal and a clock signal is lost in the PLL circuit. Thus, when the other data signal is input to the PLL circuit after the interruption of the input, it takes time to re-establish synchronization between the data signal and the clock signal, an error occurs in a portion of the data signal, and the quality of transmission may decrease.

Hereinafter, an embodiment of a technique for reducing an effect of the interruption of the input of a signal on the quality of transmission is described in detail with reference to the drawings.

Figure 1:
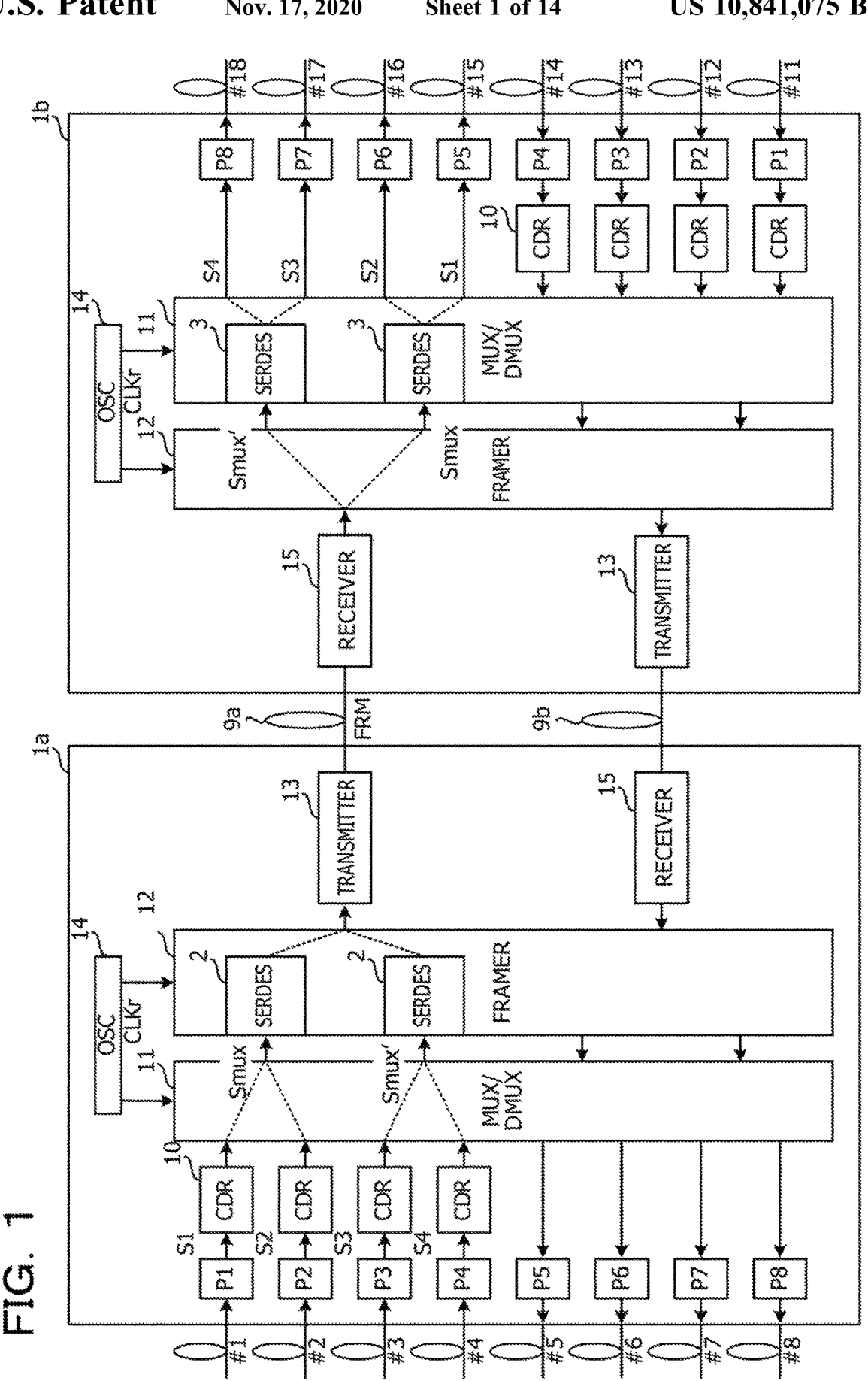
FIG. 1 is a configuration diagram illustrating an example of a transmission system.

FIG. 1 is a configuration diagram illustrating a transmission system. The transmission system includes a pair of transmission devices 1a and 1b coupled to each other via transmission paths 9a and 9b, such as optical fibers. The transmission device 1a is coupled to lines #1 to #8 of a client network. The transmission device 1b is coupled to lines #11 to #18 of the client network.

Each of the transmission devices 1a and 1b transmits an optical signal based on an optical transport network (OTN) technique as an example, but is not limited to this. Each of the transmission devices 1a and 1b may transmit an electric signal based on another technique. The OTN technique is defined by International Telecommunication Union Telecommunication Standardization Sector (ITU-T) Recommendation G.709.

The transmission device 1a transmits an optical signal to the transmission device 1b via the transmission path 9a. The transmission device 1b transmits an optical signal to the transmission device 1a via the transmission path 9b. The following description exemplifies a process of transmitting an optical signal from the transmission device 1a to the transmission device 1b. The following description applies to a process of transmitting an optical signal from the transmission device 1b to the transmission device 1a.

Each of the transmission devices 1a and 1b includes ports P1 to P8, clock reproducers (clock data recovery (CDR)) 10 for the ports P1 to P4, a multiplexer and demultiplexer (MUX/DMUX) 11, a framer 12, an oscillator (OSC) 14, a transmitter 13, and a receiver 15. The clock reproducers 10, the multiplexer and demultiplexer 11, and the framer 12 are circuits, each of which is composed of hardware, such as a field programmable gate array (FPGA) or an application specific integrated circuit (ASIC), for example.

The ports P1 to P4 are reception ports that receive optical signals from the lines #1 to #4 and #11 to #14. Each of the ports P1 to P4 includes a photo detector (PD) and a demodulator, for example.

The ports P5 to P8 are transmission ports that transmit optical signals to the lines #5 to #8 and #15 to #18. Each of the ports P5 to P8 includes a laser diode and a modulator, for example. The following describes an example in which the transmission device 1a transmits optical signals received by the ports P1 to P4 to the transmission device 1b and the transmission device 1b transmits the optical signals from the ports P5 to P8 to the lines #15 to #18.

First, a transmission process by the transmission device 1a is described below. The ports P1 to P4 convert optical signals received from the lines #1 to #4 into electric data signals S1 to S4 and output the data signals S1 to S4 to the clock reproducers 10, respectively. The data signals S1 and S2 are an example of first and second signals.

The clock reproducers 10 use CDR functions to reproduce transmission clock signals from the data signals S1 to S4 and output the transmission clock signals to the multiplexer and demultiplexer 11. The data signals S1 to S4 are, for example, Ethernet (registered trademark, the same applies to the following) signals, but are not limited to this.

The multiplexer and demultiplexer 11 executes time division multiplexing on the data signals S1 to S4 input from the separate lines #1 to #4 and outputs the signals to the framer 12. As an example, the multiplexer and demultiplexer 11 generates a multiplexed signal Smux by executing the time division multiplexing on the data signals S1 and S2 and generates a multiplexed signal Smux' by executing the time division multiplexing on the data signals S3 and S4.

The framer 12 causes the multiplexed signals Smux and Smux' to be included in a frame signal FRM and outputs the frame signal FRM to the transmitter 13. The framer 12 includes SERDESs 2 for the multiplexed signals Smux and Smux'. The multiplexed signals Smux and Smux' are input to the SERDESs 2, respectively.

Each of the SERDESs 2 is an example of a transmission circuit. The SERDESs 2 compensate for degradation of the multiplexed signals Smux and Smux', reproduce a clock signal, execute serial-to-parallel conversion, and the like. Configurations of the SERDESs 2 are described later. The oscillator 14 distributes a reference clock signal CLKr to the multiplexer and demultiplexer 11 and the framer 12.

The transmitter 13 includes a laser diode and a modulator, for example. The transmitter 13 executes electrical-to-optical conversion on the frame signal FRM and transmits the frame signal FRM to the transmission path 9a.

Next, a transmission process by the transmission device 1b is described below. The receiver 15 includes a PD and a demodulator, for example. The receiver 15 executes optical-to-electrical conversion on the frame FRM and outputs the frame signal FRM to the framer 12. The framer 12 separates the multiplexed signals Smux and Smux' from the frame signal FRM and outputs the multiplexed signals Smux and Smux' to the multiplexer and demultiplexer 11.

The multiplexer and demultiplexer 11 includes SERDESs 3 for the multiplexed signals Smux and Smux'. The multiplexed signals Smux and Smux' are input to the SERDESs 3, respectively. The SERDESs 3 execute parallel-to-serial conversion on data of the multiplexed signals Smux and Smux'.

The multiplexer and demultiplexer 11 separates the data signals S1 and S2 from the multiplexed signal Smux and outputs the data signals S1 and S2 to the ports P5 and P6. The multiplexer and demultiplexer 11 separates the data signals S3 and S4 from the multiplexed signal Smux' and outputs the data signals S3 and S4 to the ports P7 and P8. The ports P5 to P8 convert the data signals S1 to S4 to optical signals and transmit the optical signals to the lines #15 to #18.

Figure 2:
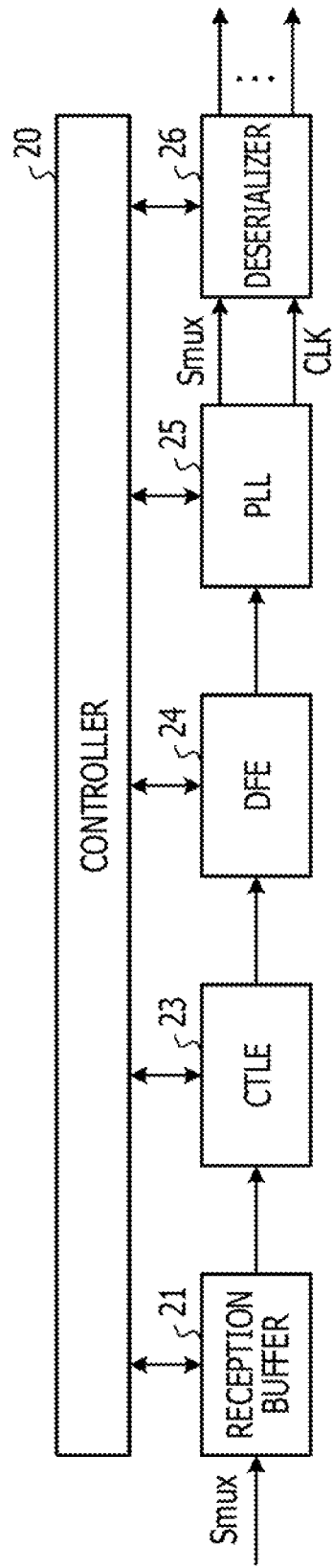
FIG. 2 is a configuration diagram illustrating an example of a serializer and deserializer (SERDES)

FIG. 2 is a configuration diagram illustrating an example of each of the SERDESs 2. Each of the SERDESs 2 includes a controller 20, a reception buffer 21, a continuous time linear equalizer (CTLE) 23, a DFE 24, a PLL 25, and a deserializer 26. Although the following description exemplifies a process to be executed on the multiplexed signal Smux, the following description applies to a process to be executed on the multiplexed signal Smux'.

The multiplexed signal Smux passes through the reception buffer 21, the CTLE 23, the DFE 24, the PLL 25, and the deserializer 26 in this order. The controller 20 controls processes of the reception buffer 21, the CTLE 23, the DFE 24, the PLL 25, and the deserializer 26.

The reception buffer 21 converts the multiplexed signal Smux from the pair of differential signals to a single multiplexed signal Smux and outputs the single multiplexed signal Smux to the CTLE 23. The CTLE 23 shapes the waveform of the multiplexed signal Smux and outputs the multiplexed signal Smux to the DFE 24.

The DFE 24 is an example of a filter circuit and compensates for degradation of the multiplexed signal Smux. The DFE 24 outputs the multiplexed signal Smux to the PLL 25.

The PLL 25 is an example of a PLL circuit and reproduces a clock signal CLK from the multiplexed signal Smux. Therefore, the clock signal CLK corresponding to a phase of data shaped by the CTLE 23 and the DFE 24 is obtained.

The deserializer 26 executes serial-to-parallel conversion on the multiplexed signal Smux based on the clock signal CLK. Thus, the deserializer 26 may reduce the transmission rate of the multiplexed signal Smux in the transmission devices 1a and 1b. For example, by converting, from serial data to parallel data, the multiplexed signal Smux transmitted at the rate of several tens of gigabits, the transmission rate may be reduced to a rate of several hundreds of megabits suitable for an internal control process.

Figure 3:
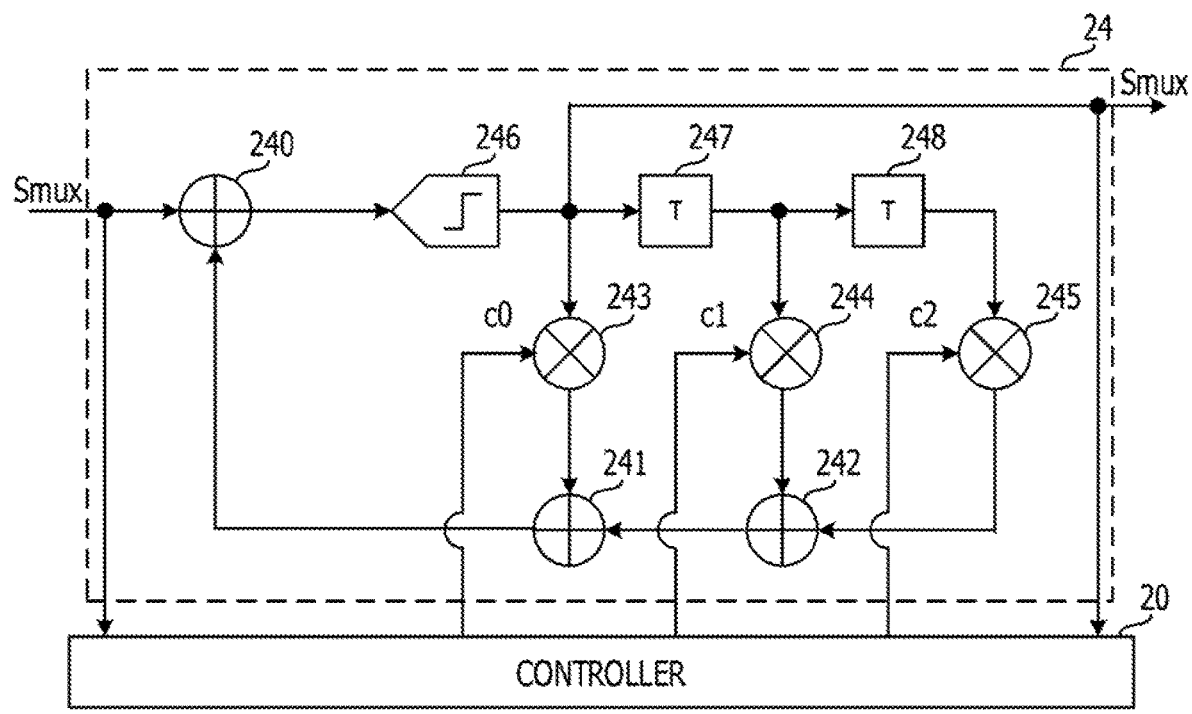
FIG. 3 is a configuration diagram illustrating an example of a decision feedback equalizer (DFE)

FIG. 3 is a configuration diagram illustrating an example of the DFE 24. The DFE 24 includes, for example, a finite impulse response (FIR) filter and suppresses inter-symbol interference (ISI).

For example, when one symbol of a logical value "1" exists in a range in which logical values "0" of the data of the multiplexed signal Smux are continuously present, or when one symbol of a logical value "0" of the multiplexed signal Smux exists in a range in which logical values "1" are continuously present, it is difficult to determine a logical value due to a constraint on electric response characteristics. Therefore, the DFE 24 delays the multiplexed signal Smux and executes feedback on the multiplexed signal Smux, thereby correcting a threshold for the determination of the logical values.

The DFE 24 includes adders 240 to 242, multipliers 243 to 245, delay units 247 and 248, and a sampling circuit 246.

The multiplexed signal Smux input to the DFE 24 is added to the multiplexed signal Smux subjected to the feedback in the adder 240. The multiplexed signal Smux is input from the adder 240 to the sampling circuit 246. The sampling circuit 246 samples the multiplexed signal Smux to shape the waveform of the multiplexed signal Smux and outputs the multiplexed signal Smux to the PLL 25 and the delay units 247 and 248.

Each of the delay units 247 and 248 delays the multiplexed signal Smux by one clock cycle. The multipliers 243 to 245 multiply tap coefficients c0 to c2 input from the controller 20 by the multiplexed signal Smux. The tap coefficients c0 to c2 correspond to amplification rates to be used to correct the multiplexed signal Smux.

The multiplexed signal Smux is input to the multiplier 243 from between the sampling circuit 246 and the delay unit 247. The multiplier 243 multiplies the multiplexed signal Smux by the tap coefficient c0 and outputs the multiplexed signal Smux multiplied by the tap coefficient c0 to the adder 241.

The multiplexed signal Smux is input to the multiplier 244 from between the delay unit 247 and the delay unit 248. The multiplier 244 multiplies the multiplexed signal Smux by the tap coefficient c1 and outputs the multiplexed signal Smux multiplied by the tap coefficient c1 to the adder 242.

The multiplexed signal Smux is input to the multiplier 245 from the delay unit 248. The multiplier 245 multiplies the multiplexed signal Smux by the tap coefficient c2 and outputs the multiplexed signal Smux multiplied by the tap coefficient c2 to the adder 242.

The adder 242 sums the multiplexed signals Smux input from the multipliers 244 and 245 and outputs the sum of the multiplexed signals Smux to the adder 241. The adder 241 sums the multiplexed signals Smux input from the multiplier 243 and the adder 242 and outputs the sum of the multiplexed signals Smux to the adder 240. In the foregoing manner, the multiplexed signal Smux is subjected to the feedback.

The controller 20 controls the tap coefficients c0 to c2 based on the multiplexed signals Smux of the input and output sides of the controller 20 in accordance with an algorithm, such as the constant modulus algorithm (CMA). Therefore, the tap coefficients c0 to c2 are adaptively updated based on the multiplexed signal Smux. The DFE 24 compensates for degradation of the multiplexed signal Smux based on the tap coefficients c0 to c2.

Figure 4:
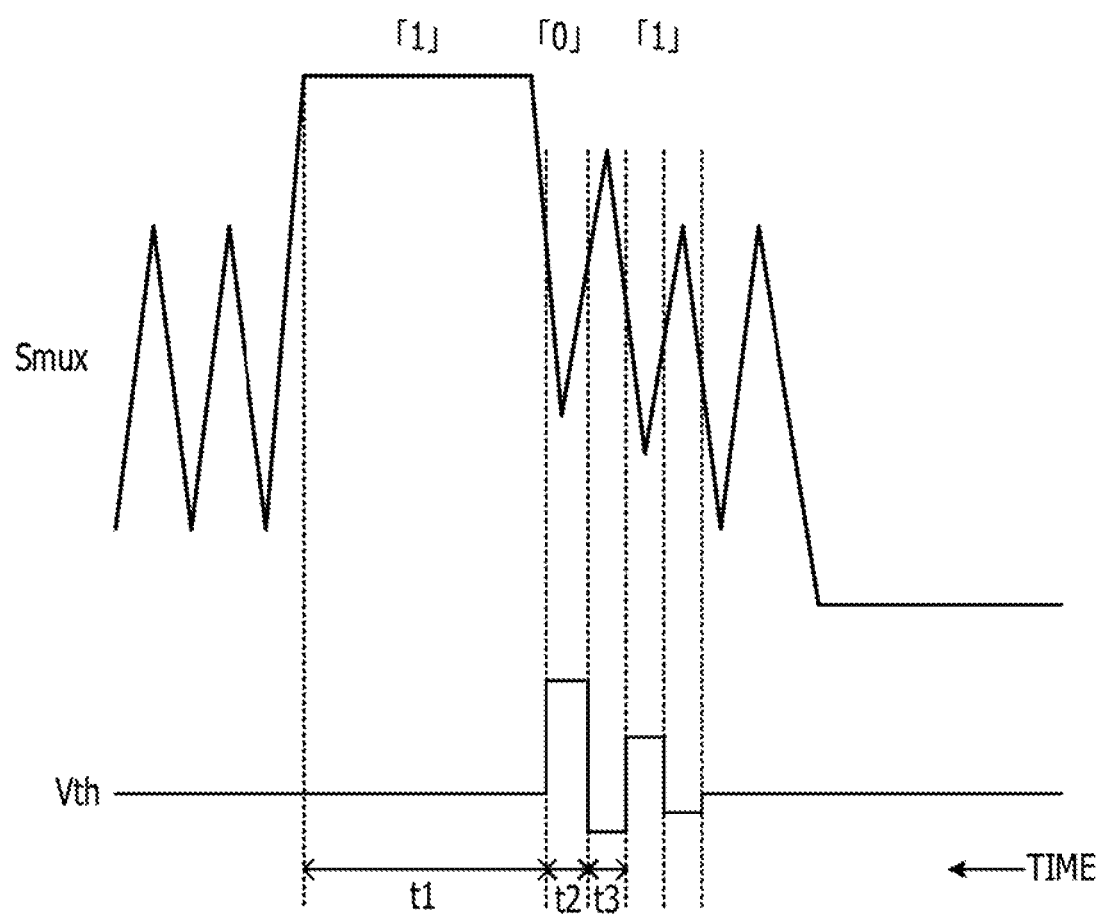
FIG. 4 is a diagram illustrating an example of the correction of a threshold voltage to be used to determine a logical value of a multiplexed signal.

FIG. 4 is a diagram illustrating an example of the correction of a threshold voltage Vth to be used to determine a logical value of the multiplexed signal Smux. In FIG. 4, a left direction indicates a time direction.

In a time period t1, the logical value of the multiplexed signal Smux continuously indicates "1". Therefore, at a time t2 after the time period t1, the DFE 24 increases the threshold voltage Vth so that the logical value "0" is normally determined. At a time t3 after the time t2, the DFE 24 reduces the threshold voltage Vth so that the logical value "1" immediately after the logical value "0" is normally determined. In this manner, the DFE 24 suppresses an effect of the ISI.

Figure 5:
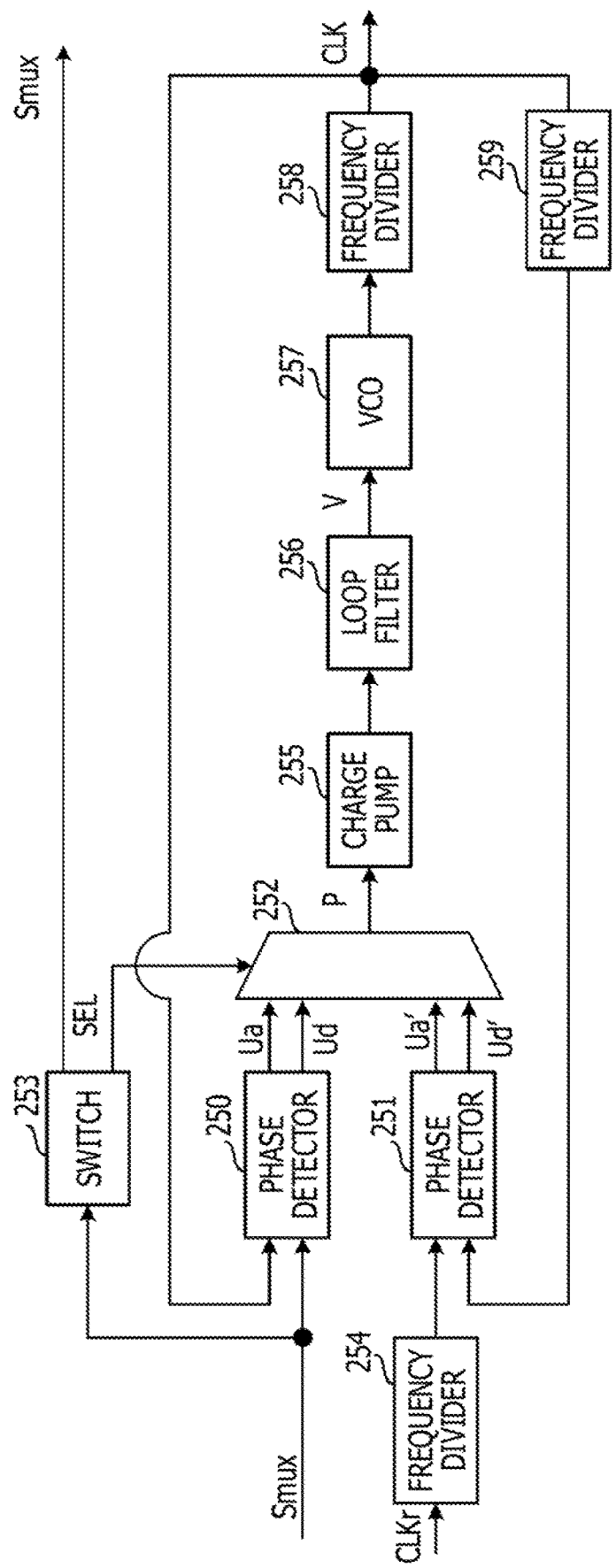
FIG. 5 is a configuration diagram illustrating an example of a PLL.

FIG. 5 is a configuration diagram illustrating an example of the PLL 25. The PLL 25 includes phase detectors (PDs) 250 and 251, a selector 252, a switch 253, frequency dividers 254, 258, and 259, a charge pump 255, a loop filter 256, and a VCO 257.

The VCO 257 oscillates at a frequency corresponding to a control voltage V input from the loop filter 256 to output the clock signal CLK. As the control voltage V is higher, the frequency is higher. However, as the control voltage V is lower, the frequency may be higher. The clock signal CLK is frequency-divided by the frequency divider 258 and output to the deserializer 26 (illustrated in FIG. 2) installed on the downstream side of the PLL 25. The frequency-divided clock signal CLK is branched into clock signals CLK. One of the clock signals CLK is further frequency-divided by the frequency divider 259 and input to the phase detector 251. The other of the clock signals CLK is input to the phase detector 250.

The multiplexed signal Smux and the clock signal CLK are input to the phase detector 250. The phase detector 250 detects a phase difference between the multiplexed signal Smux and the clock signal CLK by comparing the positions of edges of the waveforms of the multiplexed signal Smux and the clock signal CLK. The phase detector 250 outputs, to the selector 252, pulse signals Ua and Ud having widths corresponding to the phase difference. Information (hereinafter referred to as "phase information") of the phase difference indicated by the pulse signals Ua and Ud is an example of control information corresponding to the phase of the multiplexed signal Smux.

The pulse signal Ua has a positive-going amplitude and is output when the phase of the multiplexed signal Smux leads the clock signal CLK. The pulse signal Ud has a negative-going amplitude and is output when the phase of the multiplexed signal Smux lags the clock signal CLK.

The reference clock signal CLKr is frequency-divided by the frequency divider 254 and input to the phase detector 251. The reference clock signal CLKr and the clock signal CLK are input to the phase detector 251. The phase detector 251 detects a phase difference between the reference clock signal CLKr and the clock signal CLK by comparing the positions of edges of the waveforms of the reference clock signal CLKr and the clock signal CLK. The phase detector 251 outputs, to the selector 252, pulse signals Ua' and Ud' having widths corresponding to the phase difference.

The pulse signal Ua' has a positive-going amplitude and is output when the phase of the reference clock signal CLKr leads the clock signal CLK. The pulse signal Ud' has a negative-going amplitude and is output when the phase of the reference clock signal CLKr lags the clock signal CLK.

The multiplexed signal Smux is input to the switch 253. The switch 253 outputs a selection signal SEL to the selector 252. The selector 252 selects either the pulse signals Ua and Ud or the pulse signals Ua' and Ud' based on the selection signal SEL and outputs the selected pulse signals as a phase signal P to the charge pump 255.

When the multiplexed signal Smux is input to the switch 253, the switch 253 outputs the selection signal SEL instructing to select the pulse signals Ua and Ud so that the clock signal CLK is synchronized with the multiplexed signal Smux. When the input of the multiplexed signal Smux is interrupted, the synchronization between the clock signal CLK and the multiplexed signal Smux is lost, and thus the switch 253 outputs the selection signal SEL instructing to select the pulse signals Ua' and Ud' so that the clock signal CLK is synchronized with the reference clock signal CLKr.

In the foregoing manner, the clock signal CLK is synchronized with the multiplexed signal Smux or the reference clock signal CLKr. The multiplexed signal Smux is output from the switch 253 to the deserializer 26 installed on the downstream side of the PLL 25.

The charge pump 255 converts the phase signal P into an analog signal and outputs the analog signal to the loop filter 256. The loop filter 256 outputs the control voltage V corresponding to the analog signal to the VCO 257.

Figure 6:
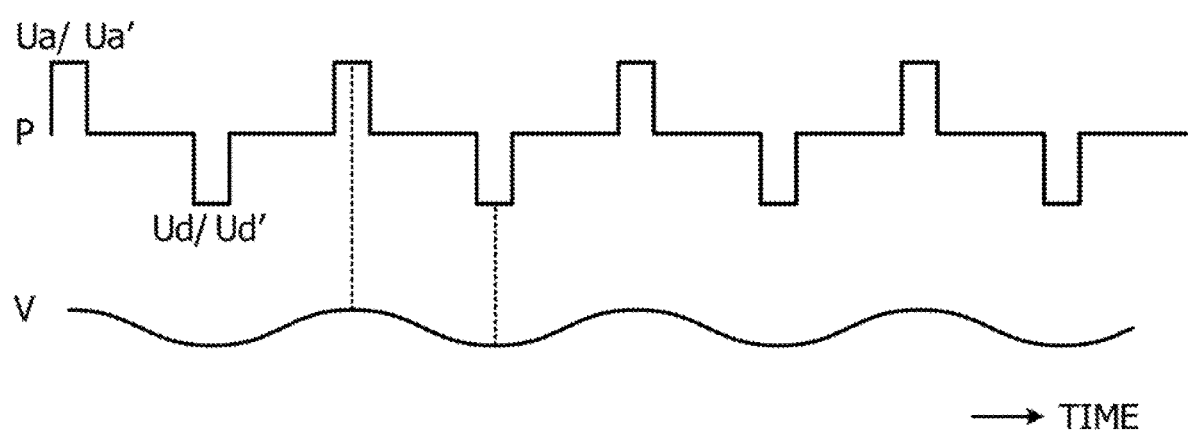
FIG. 6 is a diagram illustrating an example of a phase signal and a control voltage.

FIG. 6 is a diagram illustrating an example of the phase signal P and the control voltage V with reference to FIGS. 1, 2, and 5. For example, the positive-going pulse signals Ua and Ua' correspond to the maximum value of the control voltage V, while the negative-going pulse signals Ud and Ud' correspond to the minimum value of the control voltage V. Therefore, the frequency of the VCO 257 is controlled by the phase signal P.

In this manner, the PLL 25 controls the frequency of the clock signal CLK to be synchronized with the multiplexed signal Smux, based on the pulse signals Ua and Ud corresponding to the phases of the data signals S1 and S2 multiplexed to form the multiplexed signal Smux. The PLL 25 controls, based on the phase of the reference clock signal CLKr having a fixed frequency, the frequency of the clock signal CLK in response to the interruption of the input of the data signal S1 or S2. Therefore, the PLL 25 may output the clock signal CLK even when the input of the data signal S1 or S2 is interrupted.

The PLL 25 controls the frequency of the clock signal CLK based on the control voltage V corresponding to the phase signal P. Therefore, the frequency may be controlled based on the control voltage V corresponding to the phases of the data signals S1 and S2.

Figure 7:
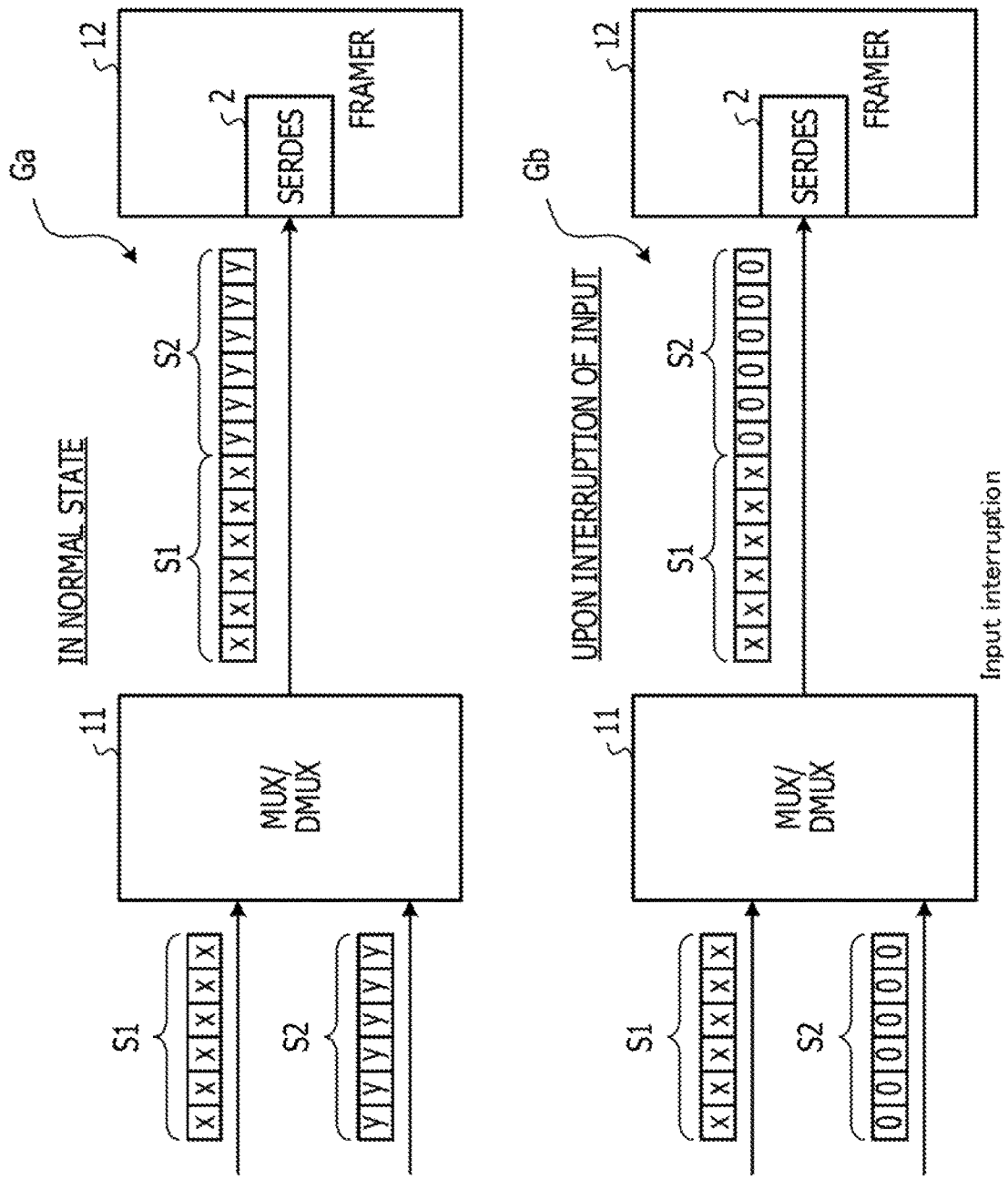
FIG. 7 is a diagram illustrating a state in which data signals are input to a framer from a multiplexer and demultiplexer.

FIG. 7 is a diagram illustrating a state in which the data signals S1 and S2 are input to the framer 12 from the multiplexer and demultiplexer 11. In FIG. 7, data of the data signal S1 is represented by "x", and data of the data signal S2 is represented by "y".

As indicated by a reference sign Ga, the data signals S1 and S2 input to the multiplexer and demultiplexer 11 are subjected to the time division multiplexing and input to the SERDESs 2 in a normal state. As indicated by a reference sign Gb, however, when the input of the data signal S2 is interrupted, the clock reproducer 10 does not reproduce the transmission clock signal from the data signal S2, and thus the data signal S2 with continuous logical values "0" is input to the multiplexer and demultiplexer 11.

As an example, the multiplexer and demultiplexer 11 executes the time division multiplexing on the data signals S1 and S2 so that the data signal S1 succeeds the data signal S2 with the logical values "0". Then, the multiplexer and demultiplexer 11 outputs the data signals S1 and S2 to the SERDESs 2. When the data signal S2 with the logical values "0" is input to the SERDES 2, the feedback control of the DFE 24 becomes invalid and thus the data signal S2 with the logical values "0" is output to the PLL 25.

Referring to FIG. 5, since the phase detector 250 does not detect a phase difference between the clock signal CLK and the data signal S2 in the PLL 25, the synchronization of the clock signal CLK is lost. Therefore, the switch 253 switches the selector 252 based on the selection signal SEL so that the clock signal CLK is synchronized with the reference clock signal CLKr.

After that, when the data signal S1 is input to the PLL 25, the switch 253 switches the selector 252 based on the selection signal SEL again so that the clock signal CLK is synchronized with the data signal S1. However, it may take time to establish the synchronization between the data signal S1 and the clock signal CLK, an error may occur in a portion of the data signal S1, and the quality of the transmission may decrease.

Figure 8:
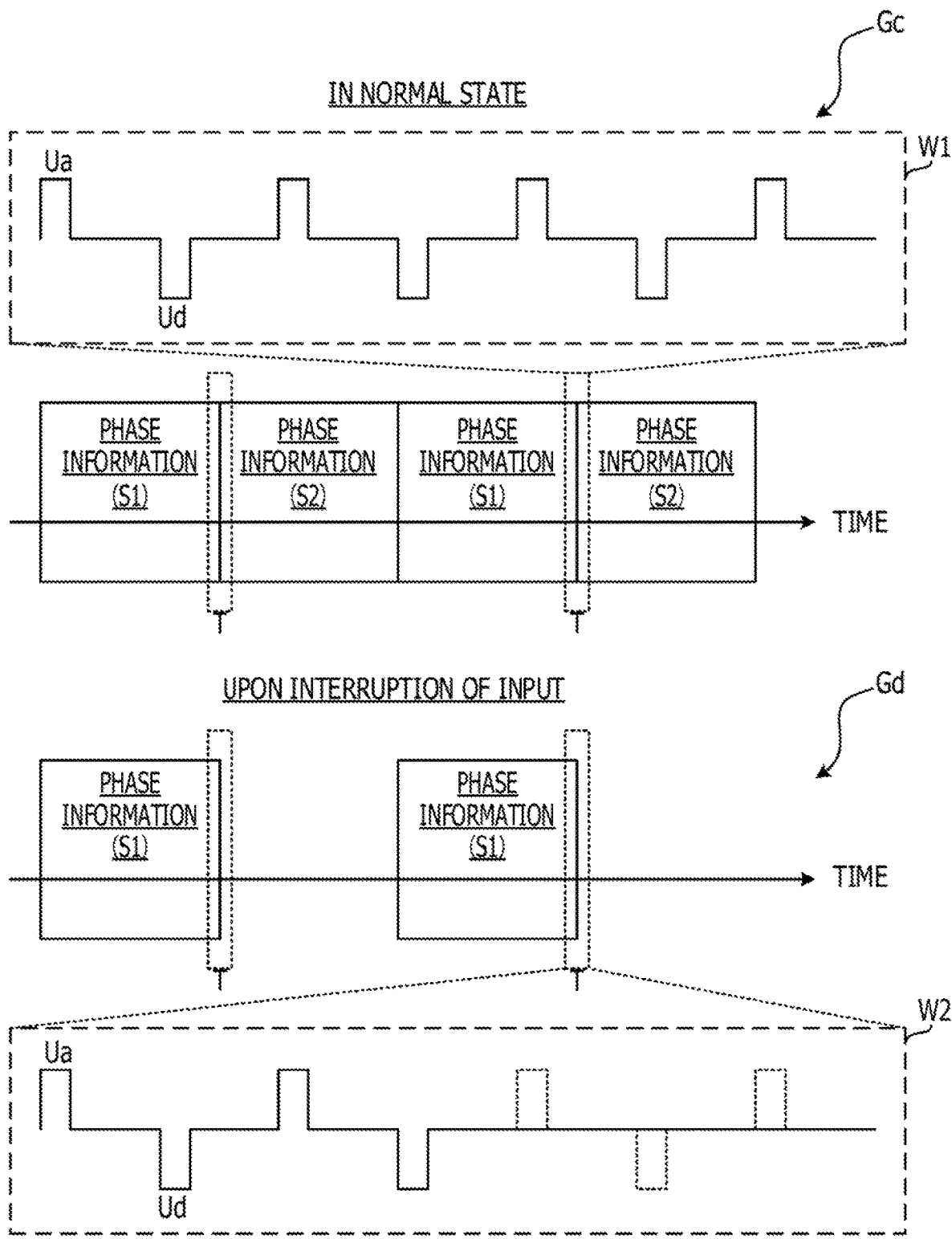
FIG. 8 is a diagram illustrating an example of the phase signal in a normal state and upon interruption of input.

FIG. 8 is a diagram illustrating an example of the phase signal P in a normal state and upon the interruption of the input. As indicated by a reference sign Gc, in the normal state, phase information ("phase information (S2)") of the data signal S2 and phase information ("phase information (S1)") of the data signal S1 are alternately output as the phase signal P to the charge pump 255.

A reference sign W1 indicates an example of the phase signal P at a boundary time T corresponding to a boundary between the phase information. The phase signal P includes the pulse signals Ua and Ud indicating the phase information of the data signals S1 and S2.

As indicated by a reference sign Gd, upon the interruption of the input of the data signal S2, the phase information of the data signal S2 is not input to the charge pump 255. A reference sign W2 indicates an example of the phase signal P at the boundary time T corresponding to the boundary between the phase information. The phase signal P includes the pulse signals Ua and Ud indicating only the phase information of the data signal S1 and does not include the pulse signals Ua and Ud indicating the phase information of the data signal S2. Therefore, the synchronization of the clock signal CLK is lost.

Figure 9:
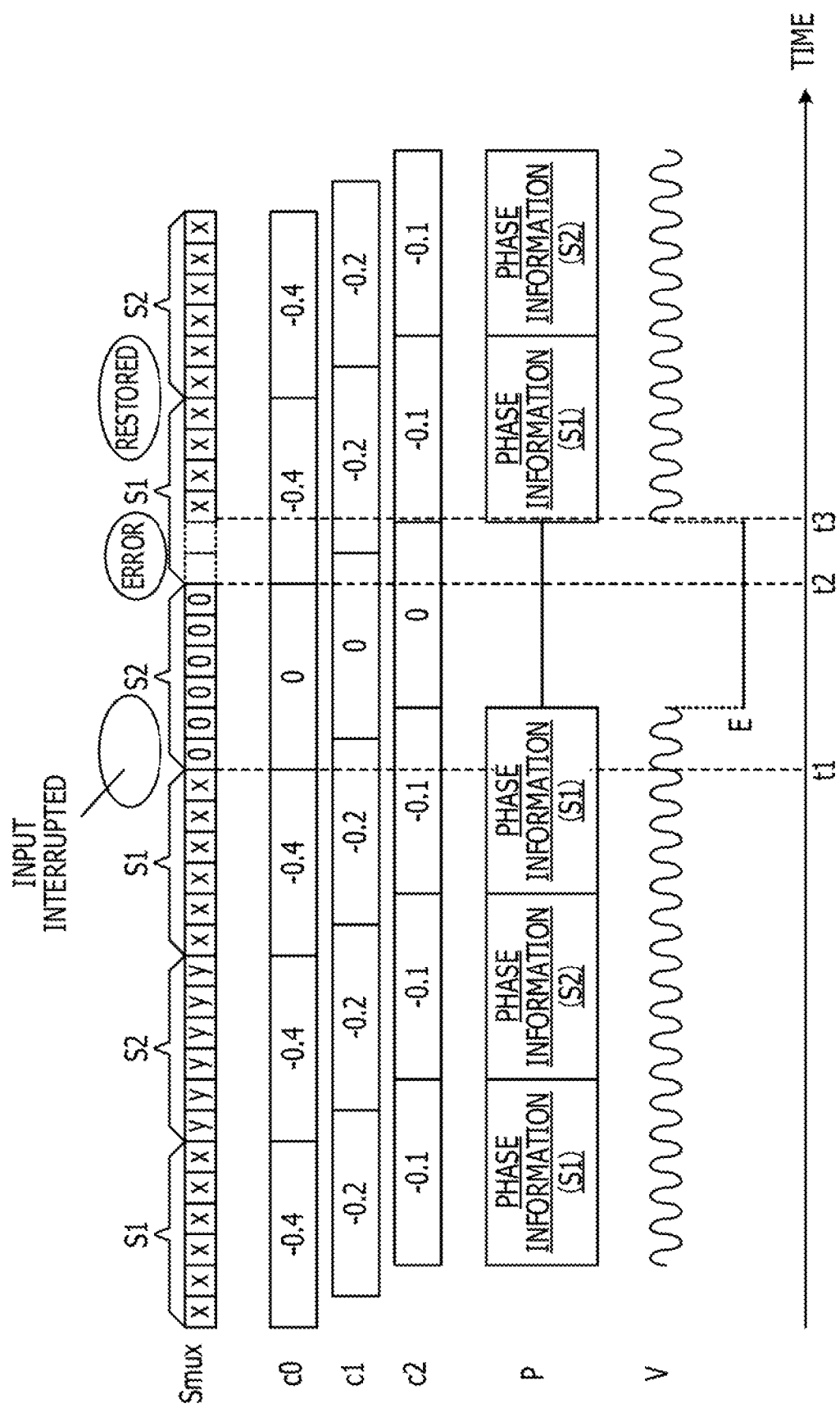
FIG. 9 is a time chart in the case where an error occurs in a certain data signal due to the interruption of the input of another data signal.

FIG. 9 is a time chart in the case where an error occurs in the data signal S1 due to the interruption of the input of the data signal S2 with reference to FIG. 5. The time chart indicates changes over time in the multiplexed signal Smux, the tap coefficients c0 to c2, the phase signal P, and the control voltage V.

The data signals S1 and S2 are alternately subjected to the time division multiplexing to form the multiplexed signal Smux. The controller 20 controls the tap coefficients c0 to c2 based on the data signals S1 and S2. In this example, the tap coefficients c0 to c2 of the data signals S1 and S2 in the normal state are the same, but may be different.

In a time period from a time t1 to a time t2, when the input of the data signal S2 is interrupted, the logical value of the data signal S2 is "0". In response to this, the feedback control of the DFE 24 becomes invalid and the tap coefficients c0 to c2 sequentially change to "0". Due to the interruption of the input, the phase information of the data signal S2 is not output to the charge pump 255.

In this case, since the clock signal CLK is synchronized with the reference clock signal CLKr, the control voltage V changes to a value E corresponding to the phase of the reference clock signal CLKr. For example, when a driving voltage of the VCO 257 is 2.5 V, the value E is 1.25 V or ½ of the driving voltage.

When the data signal S1 immediately succeeding the interrupted data signal S2 is input to the PLL 25, the clock signal CLK is synchronized with the data signal S1 again, but it takes time to establish the synchronization and an error occurs in a top portion (portion at times t2 to t3) of the data signal S1. After that, when the data signal S2 is restored, the phase information of the data signal S2 is input to the charge pump 255.

Even when the input of the data signal S2 is interrupted, the synchronization of the clock signal CLK is maintained and thus the following method may be used.

Figure 10:
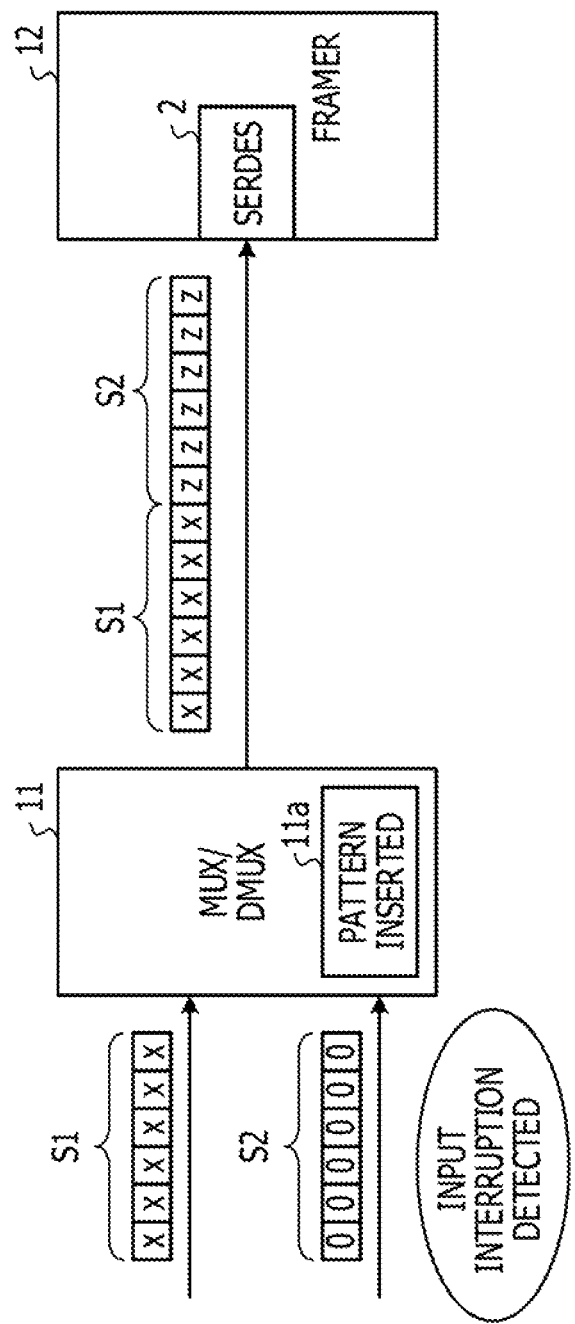
FIG. 10 is a diagram illustrating a state in which a fixed pattern is inserted in a data signal.

FIG. 10 is a diagram illustrating a state in which a fixed pattern is inserted in the data signal S2. Configurations illustrated in FIG. 10 and common to those illustrated in FIG. 7 are indicated by the same reference signs as those illustrated in FIG. 7 and will not be described below.

The multiplexer and demultiplexer 11 may detect the interruption of the input of the data signal S2, and a pattern inserting circuit 11a within the multiplexer and demultiplexer 11 may insert a fixed pattern "z" in the data signal S2 based on the detection. The data signal S2 may be subjected to a scrambling process, instead of the fixed pattern.

According to the foregoing method, however, not only a detecting circuit for detecting the interruption of the input is to be installed, but also the size of the pattern inserting circuit 11a or the size of a scrambling circuit is large. Therefore, the cost of the transmission devices 1a and 1b and the amount of power to be consumed by the transmission devices 1a and 1b may increase. When an analog circuit for detecting the interruption of the input is used, a time period for the detection may not satisfy a condition.

As described below, a data processing circuit that detects the interruption of the input of the data signal S2 based on the tap coefficients c0 to c2 and replaces the phase information of the data signal S2 with the phase information of the data signal S1 based on the detection is installed in each of the SERDESs 2.

Figure 11:
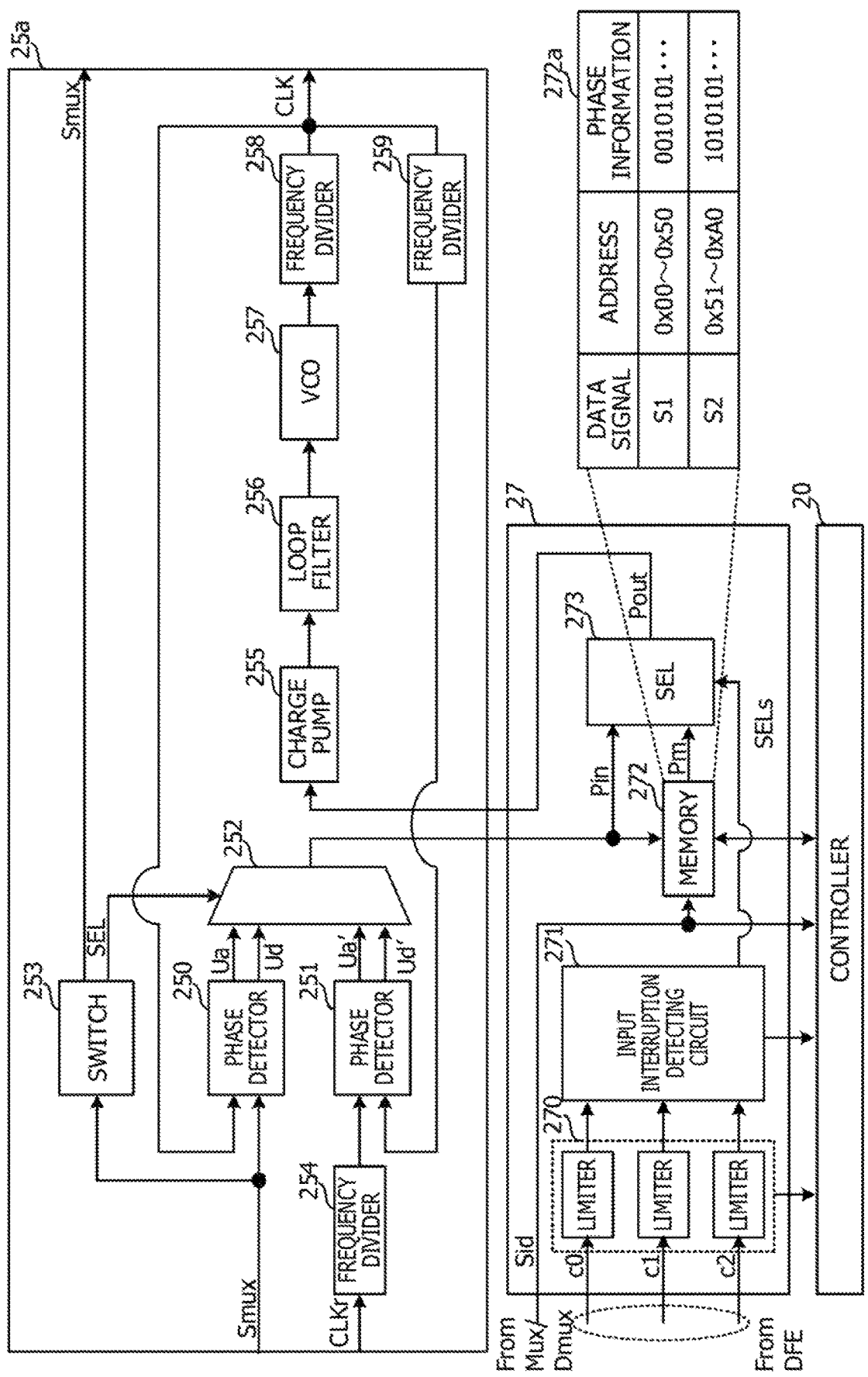
FIG. 11 is a configuration diagram illustrating an example of a data processing circuit and the PLL.

FIG. 11 is a configuration diagram illustrating an example of the data processing circuit 27 and a PLL 25a. Configurations illustrated in FIG. 11 and common to those illustrated in FIG. 5 are indicated by the same reference signs as those illustrated in FIG. 5 and will not be described.

The data processing circuit 27 and the PLL 25a are installed in each of the SERDESs 2, instead of the PLL 25 illustrated in FIG. 2. A configuration of the PLL 25a is different from that of the PLL 25 in that the data processing circuit 27 is inserted between the selector 252 and the charge pump 255. A phase signal Pout is input to the charge pump 255 from the selector 252 via the data processing circuit 27.

The data processing circuit 27 includes limiters 270 for the tap coefficients c0 to c2, an input interruption detecting circuit 271, a memory 272, and an information selector 273. The data processing circuit 27 is coupled to the PLL 25a, the controller 20, the multiplexer and demultiplexer 11, and the DFE 24. The data processing circuit 27 is an example of a control circuit.

The data processing circuit 27 detects the interruption of the input of the data signal S1 or S2 based on the tap coefficient c0 to c2. The tap coefficients c0 to c2 are input to the data processing circuit 27 from the DFE 24 via, for example, high-speed serial communication of an FPGA. The limiters 270 define the tap coefficients c0 to c2 in a predetermined range in consideration of an unstable state immediately after the activation of the transmission devices 1a and 1b. When the tap coefficients c0 to c2 exceed the predetermined range, the limiters 270 notifies the controller 20 that the tap coefficients c0 to c2 exceed the predetermined range.

The tap coefficients c0 to c2 are input to the input interruption detecting circuit 271 from the limiters 270. When the input of the data signal St or S2 is interrupted, the feedback control of the DFE 24 becomes invalid and the tap coefficients c0 to c2 become 0. Thus, when the tap coefficients c0 to c2 are 0, the input interruption detecting circuit 271 detects the interruption of the input.

Therefore, the interruption of the input may be easily detected without adding a complex detecting circuit. The input interruption detecting circuit 271 outputs an information selection signal SELs corresponding to the result of detecting the interruption of the input to the information selector 273.

A phase signal Pin is input to the information selector 273 from the selector 252 of the PLL 25a, and phase information Pm is input to the information selector 273 from the memory 272. The phase signal Pin from the selector 252 is input to the memory 272 and stored in the memory 272 under control by the controller 20 when the interruption of the input is not detected.

In the memory 272, an information table 272a in which the phase information of the data signals S1 and S2 is registered is held. For example, the phase information of the data signal S1 is held at addresses 0x00 to 0x50 (0x indicates hexadecimal notation), and the phase information of the data signal S2 is held at addresses 0x51 to 0xA0.

Data identification information Sid is input to the memory 272 and the controller 20 from the multiplexer and demultiplexer 11. The controller 20 writes the phase information to addresses of the memory 272 that correspond to the data identification information Sid. The memory 272 is an example of a holding circuit for holding phase information. The holding circuit is not limited to the memory 272 and may be a circuit of another type.

The information selector 273 outputs, as a phase signal Pout, the phase signal Pin from the selector 252 or the phase signal Pm including the phase information held in the memory 272 to the charge pump 255 in accordance with the information selection signal SELs. When the information selection signal SELs indicates that the input is not interrupted, the information selector 273 outputs the phase signal Pin to the charge pump 255. Thus, the PLL 25a executes operations that are the same as or similar to the operations to be executed when the phase signal P is directly input to the charge pump 255 from the selector 252.

When the information selection signal SELs indicates that the input has been interrupted, the information selector 273 outputs the phase signal Pm including the phase information held in the memory 272 to the charge pump 255. In this case, the controller 20 receives a notification indicating the interruption of the input from the input interruption detecting circuit 271 and controls the memory 272 based on the data identification information Sid so that the phase signal Pm including the phase information of the data signal S2 or S1 of which the interruption of the input is not detected is output from the memory 272.

Figure 12:
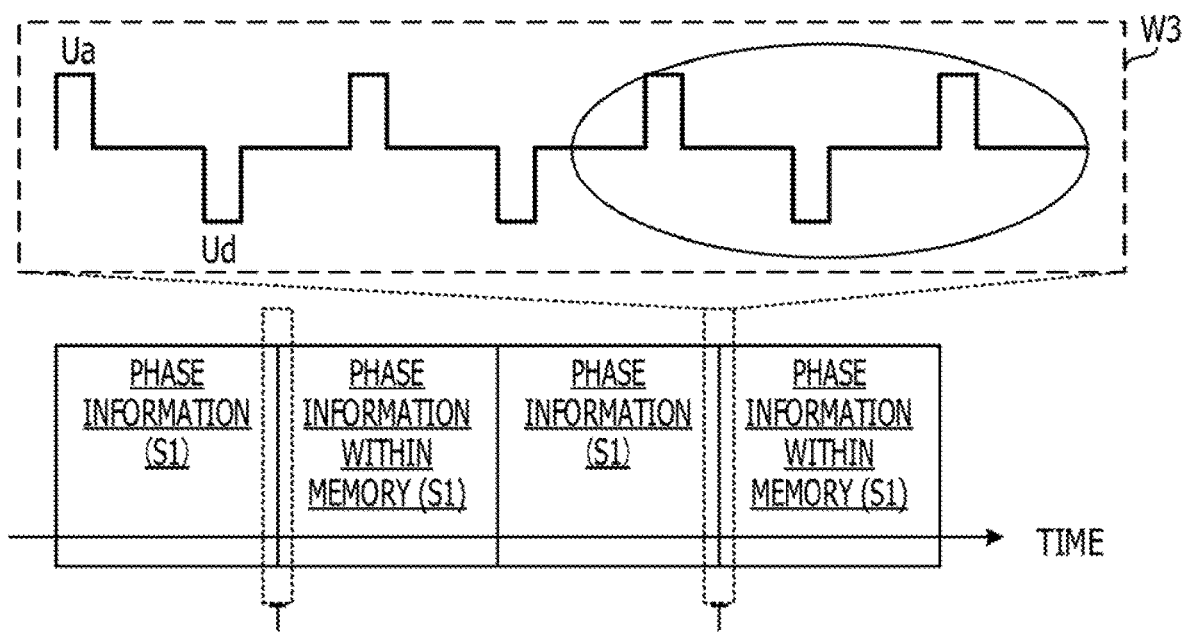
FIG. 12 is a diagram illustrating a phase signal that is input to a charge pump when the interruption of the input of a data signal is detected.

FIG. 12 is a diagram illustrating an example of the phase signal Pout that is input to the charge pump 255 when the interruption of the input of the data signal S2 is detected. As is understood from the comparison with the phase signal P exemplified in FIG. 8, the phase information of the data signal S1 within the memory 272 is input to the charge pump 255, instead of the phase information of the data signal S2.

A reference sign W3 indicates an example of the phase signal Pout at a boundary time T corresponding to a boundary between the phase information. The phase signal Pout includes not only the pulse signals Ua and Ud of the phase information of the data signal S1 from the selector 252 but also the pulse signals Ua and Ud (indicated by a circle) of the phase information of the data signal S1 from the memory 272. Therefore, the loss of the synchronization of the clock signal CLK is suppressed.

As described above, instead of the phase signal Pin of the data signal S1 or S2 of which the interruption of the input has been detected, the phase signal Pm of the other data signals S2 and S1 of which the interruption of the input is not detected is input to the charge pump 255. Therefore, even when the interruption of the input is detected, the control voltage V of the VCO 257 is controlled based on the phase information, held in the memory 272, of the data signal S2 or S1 of which the interruption of the input is not detected.

Figure 13:
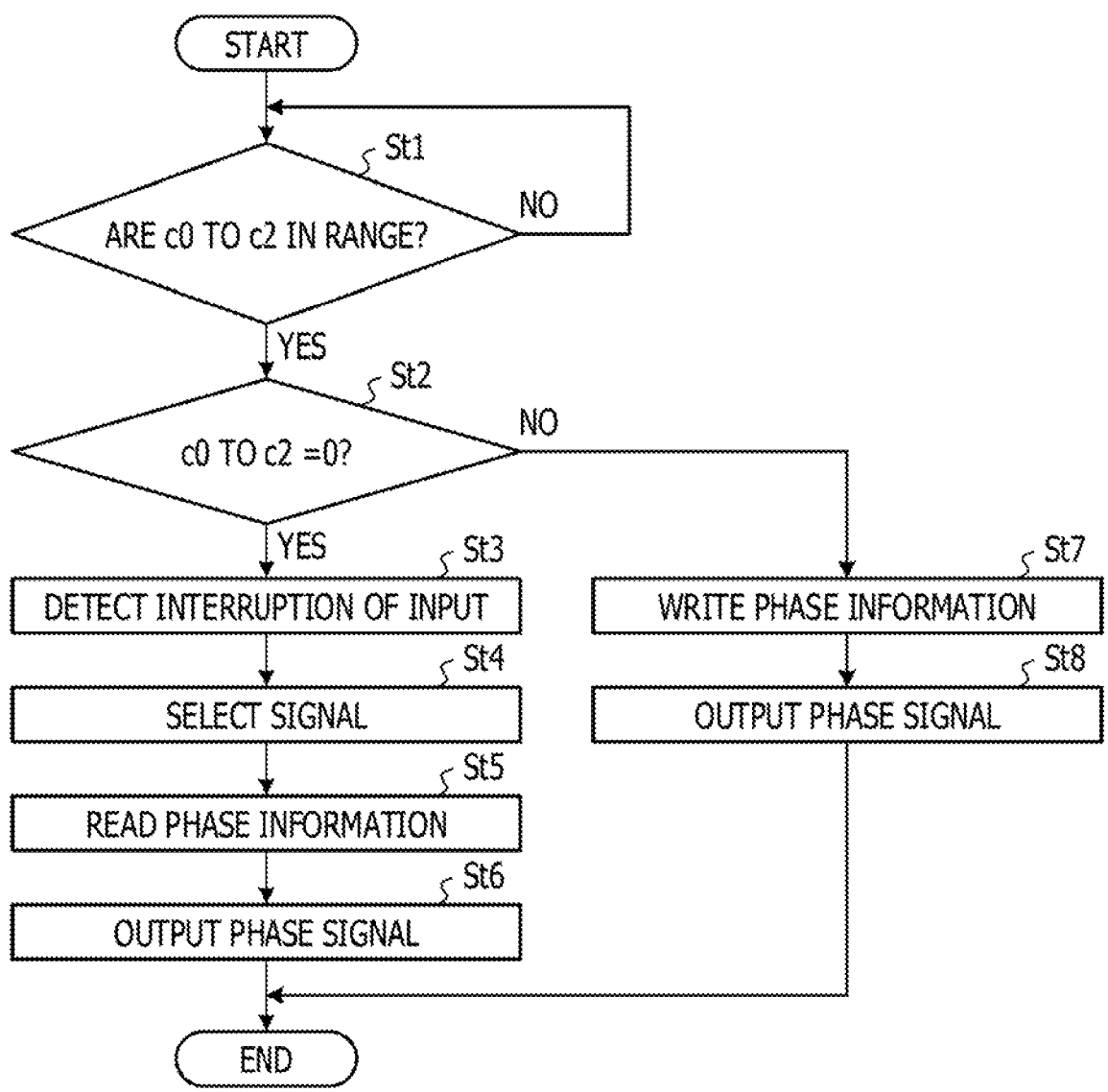
FIG. 13 is a flowchart illustrating an example of operations of the data processing circuit.

FIG. 13 is a flowchart illustrating an example of operations of the data processing circuit 27 illustrated in FIG. 11. The operations are repeatedly executed.

The data processing circuit 27 determines whether each of the tap coefficients c0 to c2 is in the predetermined range due to the limiters 270 (in operation St1). When each of the tap coefficients c0 to c2 is not in the predetermined range (No in operation St1), the data processing circuit 27 executes the process of operation St1 again.

When each of the tap coefficients c0 to c2 is in the predetermined range (Yes in operation St1), the data processing circuit 27 determines whether each of the tap coefficients c0 to c2 is 0 (in operation St2). When each of the tap coefficients c0 to c2 is not 0 (No in operation St2), the data processing circuit 27 writes the phase information included in the phase signal Pin from the selector 252 to the memory 272 (in operation St7).

Then, the data processing circuit 27 outputs the phase signal Pin from the selector 252 to the charge pump 255 via the information selector 273 (in operation St8).

When the tap coefficients c0 to c2 are 0 (Yes in operation St2), the data processing circuit 27 causes the input interruption detecting circuit to detect the interruption of the input of the data signal S1 or S2 (in operation St3). In this case, when the tap coefficients c0 to c2 are values in a range close to 0, the data processing circuit 27 detects the interruption of the input. Then, the data processing circuit 27 selects, based on the data identification information Sid, the data signal S1 or S2 of which the interruption of the input is not detected (in operation St4).

Then, the data processing circuit 27 reads, from the memory 272, the phase information of the data signal S1 or S2 of which the interruption of the input is not detected (in operation St5). Then, the data processing circuit 27 outputs, to the charge pump 255, the phase signal Pm including the phase information read from the memory 272 (in operation St6). The data processing circuit 27 operates in the foregoing manner.

Figure 14:
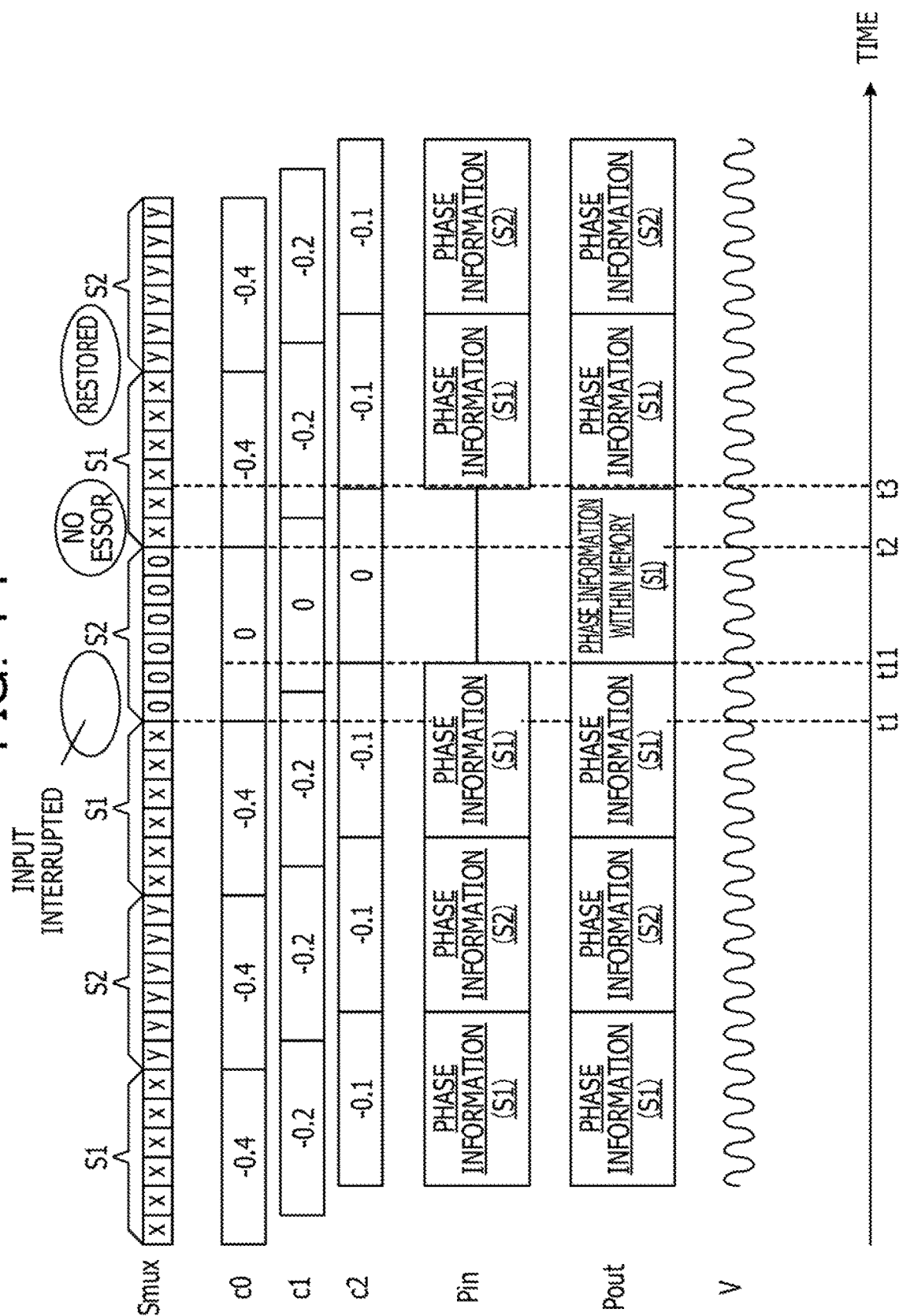
FIG. 14 is a time chart in the case where the interruption of the input of a data signal does not affect another data signal.

FIG. 14 is a time chart in the case where the interruption of the input of the data signal S2 does not affect the other data signal S1. The time chart indicates changes over time in the multiplexed signal Smux, the tap coefficients c0 to c2, the phase signals Pin and Pout, and the control voltage V. Items illustrated in FIG. 14 and common to those illustrated in FIG. 9 will not be described below.

The data processing circuit 27 detects the interruption of the input of the data signal S2 by determining that the tap coefficients c0 to c2 are 0 at a time t11. The data processing circuit 27 controls the information selector 273 based on the detection of the interruption of the input, thereby replacing the phase information of the data signal S2 of which the interruption of the input has been detected with the phase information, stored in the memory 272, of the data signal S1 of which the interruption of the input is not detected. Thus, the data processing circuit 27 outputs the phase information of the data signal S1 to the charge pump 255.

Therefore, the phase signal Pout including the phase information, stored in the memory 272, of the data signal S1 is input to the charge pump 255. Since the control voltage V is not a fixed value V, as indicated in the example of FIG. 9, and is controlled based on the phase information, stored in the memory 272, of the data signal S1, the control voltage V is equal to or nearly equal to a voltage value when the input is not interrupted.

Therefore, since the synchronization of the clock signal CLK is maintained in the time period from t1 to t2 in which the input is interrupted, an error of the succeeding data signal S1 is suppressed. Since the data processing circuit 27 may be smaller than the scrambling circuit and the pattern inserting circuit 11a, the data processing circuit 27 does not inhibit a reduction in the cost of the SERDESs 2 and a reduction in power to be consumed by the SERDESs 2.

As described above, each of the SERDESs 2 includes the DFE 24, the PLL 25a, and the data processing circuit 27. In response to the interruption of the input of the data signal S1 or S2, the data processing circuit 27 outputs, to the PLL 25a, the phase information corresponding to the phase of the other data signal S2 or S1 of which the interruption of the input is not detected.

Thus, even when the input of the data signal S1 or S2 is interrupted, the synchronization of the clock signal CLK is maintained in the PLL 25a, and an error of the other data signal S2 or S1 of which the interruption of the input is not detected is suppressed. Therefore, in the embodiment, an effect of the interruption of the input of the data signal S1 or S2 on the quality of the transmission may be reduced. The embodiment describes the case where the two data signals S1 and S2 are subjected to the time division multiplexing. The SERDESs 2, however, execute the same processes as described above even in the case where three or more data signals are subjected to the time division multiplexing.

The data processing circuit 27 holds the phase information in the memory 272 and outputs the phase information to the PLL 25a from the memory 272. Thus, the data processing circuit 27 may replace the phase information via the simple process.

The foregoing embodiment is a preferred embodiment of the present disclosure. The embodiment, however, is not limited to the foregoing and may be variously changed and modified without departing from the gist of the disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission circuit comprising:
   a filter circuit configured to compensate for degradation of a multiplexed signal, based on a tap coefficient to be updated based on a first signal and a second signal which are time-division-multiplexed to the multiplexed signal;
   a phase locked loop (PLL) circuit configured to control, based on control information corresponding to phases of the first signal and the second signal, a frequency of a clock signal to be synchronized with the multiplexed signal whose degradation has been compensated; and
   a control circuit configured to generate, in response to an interruption of an input of the first signal or the second signal, the control information corresponding to the phase of the first signal or the second signal of which the interruption is not detected so as to output the control information to the PLL circuit.

2. The transmission circuit according to claim 1, wherein the PLL circuit controls the frequency of the clock signal, based on a phase of a reference clock signal having a fixed frequency, in response to the interruption of the input of the first signal or the second signal.

3. The transmission circuit according to claim 1, wherein the control circuit includes a hold circuit configured to hold the control information corresponding to the phases of the first signal and the second signal and outputs, from the hold circuit to the PLL circuit, the control information corresponding to the phase of the first signal or the second signal of which the interruption is not detected.

4. A transmission circuit comprising:
   a clock reproducer circuit that receives a first signal and a second signal and reproduces transmission clock signals based on the first and second data signals;

a multiplexer/demultiplexer circuit that receives the transmission clock signals from the clock reproducer circuit and outputs a first multiplexed signal;

a reception buffer that converts the first multiplexed signal to a second multiplexed signal;

a controller that controls tap coefficients;

a filter circuit that receives the second multiplexed signal and multiplies the second multiplexed signal by a tap coefficient based on the tap coefficients; and a phase locked loop circuit that receives the second multiplexed signal from the filter circuit and a clock signal and synchronizes the second multiplexed signal with the clock signal.

5. The transmission circuit of claim 4 further comprising a continuous line equalizer that shapes a waveform of the first multiplexed signal.

6. The transmission circuit of claim 4, wherein the filter circuit subjects the first multiplexed signal to feedback.

7. The transmission circuit of claim 4, wherein the filter circuit delays the first multiplexed signal by one clock cycle.

8. The transmission circuit of claim 4, wherein the phase locked loop circuit detects a phase difference between the second multiplexed signal and the clock signal.

9. The transmission circuit of claim 4, wherein the phase locked loop circuit detects the phase difference by comparing positions of edges of waveforms of the second multiplexed signal and the clock signal.

\* \* \* \* \*